(12) United States Patent
Lindberg et al.

(10) Patent No.: US 12,149,891 B2
(45) Date of Patent: Nov. 19, 2024

(54) HEARING AID WITH DUAL COIL COMPONENTS FOR NOISE CANCELLATION

(71) Applicant: GN Hearing A/S, Ballerup (DK)

(72) Inventors: Christopher Wessel Lindberg, Ballerup (DK); Kim Fälling Andersen, Ballerup (DK)

(73) Assignee: GN Hearing A/S, Ballerup (DK)

( * ) Notice: Subject to any disclaimer, the term of this patent is extended or adjusted under 35 U.S.C. 154(b) by 283 days.

(21) Appl. No.: 17/707,905

(22) Filed: Mar. 29, 2022

(65) Prior Publication Data
US 2022/0377470 A1    Nov. 24, 2022

(30) Foreign Application Priority Data

May 21, 2021 (DK) .............................. PA 202170261
May 21, 2021 (EP) .................................... 21175310

(51) Int. Cl.
*H04R 25/00*    (2006.01)

(52) U.S. Cl.
CPC ......... *H04R 25/505* (2013.01); *H04R 25/602* (2013.01); *H04R 25/604* (2013.01); *H04R 2225/49* (2013.01)

(58) Field of Classification Search
CPC .............. H04R 25/554; H04R 2225/31; H04R 2225/33; H04R 25/60; H04R 3/12;
(Continued)

(56) References Cited

U.S. PATENT DOCUMENTS 5,280,260 A * 1/1994 Juds .......................... H01F 7/14
                                                    335/266
7,006,647 B1 * 2/2006 Wuersch ................ H04R 25/60
                                                    381/322
(Continued)

FOREIGN PATENT DOCUMENTS

EP    2108977    10/2009
EP    2733962    5/2014
(Continued)

OTHER PUBLICATIONS

Extended European Search Report for EP Patent Appln. No. 21175310.8 dated Nov. 16, 2021.
(Continued)

*Primary Examiner* — Gerald Gauthier
(74) *Attorney, Agent, or Firm* — Vista IP Law Group, LLP (57) ABSTRACT

Disclosed is a hearing aid configured to be worn at a user's ear. The hearing aid comprises an input transducer for generating one or more input signals based on a received audio signal. The hearing aid comprises a signal processor configured for processing the one or more input signals. The hearing aid comprises an output transducer for providing an audio output signal based on an output signal from the signal processor. The hearing aid comprises a switched-mode power supply (SMPS) for providing electric power to the hearing aid. The switched-mode power supply (SMPS) comprises a first coil component and a second coil component. The first coil component and the second coil component are arranged to provide electromagnetic noise reduction in the hearing aid.

23 Claims, 4 Drawing Sheets

(58) Field of Classification Search
CPC ...... H04R 27/00; H04R 1/1025; H04R 25/30; H04R 25/48; H04R 25/505; H04R 25/552; H04R 25/556; H04R 25/602; H04R 25/603; H04R 25/604; H04R 25/609; H04R 2225/49; G10H 3/182; H01F 7/14; H01Q 1/48; H02M 1/44; H02M 3/156; H04M 9/082

See application file for complete search history.

(56) References Cited

U.S. PATENT DOCUMENTS

| | | | | |
|---|---|---|---|---|
| 9,601,100 | B1* | 3/2017 | Dixon | G10H 3/182 |
| 11,638,101 | B2* | 4/2023 | Nielsen | H04R 25/603 381/328 |
| 2003/0163021 | A1* | 8/2003 | Miller | H04R 25/30 600/25 |
| 2005/0117713 | A1 | 6/2005 | Waldron et al. | |
| 2006/0008110 | A1* | 1/2006 | van Halteren | H04R 25/505 381/324 |
| 2008/0300658 | A1* | 12/2008 | Meskens | H04R 25/556 607/60 |
| 2010/0303228 | A1* | 12/2010 | Zeng | H04M 9/082 379/406.08 |
| 2010/0304679 | A1* | 12/2010 | Zeng | H04M 9/082 455/63.1 |
| 2011/0298433 | A1 | 12/2011 | Tam | |
| 2014/0363037 | A1* | 12/2014 | Nikles | H04R 25/554 381/328 |
| 2017/0127196 | A1* | 5/2017 | Blum | H04R 25/554 |
| 2018/0007478 | A1* | 1/2018 | Nikles | H04R 25/552 |
| 2018/0294714 | A1 | 10/2018 | Chu et al. | |
| 2019/0165671 | A1* | 5/2019 | Gudnason | H04R 25/554 |
| 2020/0204073 | A1 | 6/2020 | Lawrence et al. | |
| 2021/0306730 | A1* | 9/2021 | Knudsen | H04R 1/1025 |
| 2021/0306773 | A1* | 9/2021 | Kvist | H01Q 1/48 |
| 2022/0181979 | A1* | 6/2022 | Moser | H02M 3/156 |
| 2022/0377470 | A1* | 11/2022 | Lindberg | H04R 25/602 |

FOREIGN PATENT DOCUMENTS

| | | | | |
|---|---|---|---|---|
| EP | 3024112 | | 5/2016 | |
| EP | 3396833 | | 10/2018 | |
| EP | 3468020 | | 4/2019 | |
| EP | 3661232 | | 6/2020 | |
| WO | WO 2015069390 | * | 5/2015 | ............ H02M 1/34 |
| WO | WO 2015/158699 | | 10/2015 | |
| WO | WO 2017/190007 | | 11/2017 | |
| WO | WO 2021078541 | * | 4/2021 | ............... H05K 3/28 |

OTHER PUBLICATIONS

Foreign Examination Report dated Nov. 23, 2021 for Danish patent application No. PA 202170261.

2nd examination report for Danish patent application No. PA 2021 70261 dated Apr. 26, 2022.

Additional Search Report for Danish patent application No. PA 2021 70261 dated Apr. 26, 2022.

* cited by examiner

HEARING AID WITH DUAL COIL COMPONENTS FOR NOISE CANCELLATION

RELATED APPLICATION DATA

This application claims priority to, and the benefit of, Danish Patent Application No. PA 202170261 filed on May 21, 2021, and European Patent Application No. 21175310.8 filed on May 21, 2021. The entire disclosures of the above applications are expressly incorporated by reference herein.

FIELD

The present disclosure relates to a hearing aid and a method for providing electromagnetic noise reduction in the hearing aid.

BACKGROUND

Hearing aids are very small and delicate devices and comprise many electric, electronic and metallic components contained in a housing or shell small enough to fit in the ear, e.g. in the ear canal of a human, or be located behind the outer ear. The small size of the hearing aid housing or shell impose high design constraints on the use and coexistence of various components, some which are highly sensitive to electromagnetic noise. The use of a switched-mode power supply in hearing aids typically produces electromagnetic noise, which may disturb sensitive components, such as a communication coil, within the hearing aid. Thus, there is a need for reducing electromagnetic noise originating from a switched-mode power supply in a hearing aid.

SUMMARY

In accordance with the present disclosure, the above-mentioned and other objects are obtained by the disclosed hearing aid and method.

Disclosed is a hearing aid configured to be worn at a user's ear. The hearing aid comprises an input transducer for generating one or more input signals based on a received audio signal. The hearing aid comprises a signal processor configured for processing the one or more input signals. The hearing aid comprises an output transducer for providing an audio output signal based on an output signal from the signal processor. The hearing aid comprises a switched-mode power supply (SMPS) for providing electric power to the hearing aid. The switched-mode power supply (SMPS) comprises a first coil component and a second coil component. The first coil component and the second coil component are arranged to provide electromagnetic noise reduction in the hearing aid.

It is an advantage that a hearing aid with improved electromagnetic noise reduction is provided. Electromagnetic noise in the hearing aid may be a disadvantage as it may disturb components within the hearing aid that are sensitive to the noise. Such components may be one or more communications coils, which wireless communication capabilities may be decreased or weakened due to such noise. Traditionally, noise sensitive components have been shielded from such noise to a certain extent by the use of a shielding element or by a battery, such as a shadow effect of a battery. However, due to the increasing strict size and design constraint of a hearing aid, the use of shielding elements may be undesirable. Additionally, due to the strict size and design constraints of a hearing aid, it may not be feasible to arrange components within a hearing aid housing such that the battery may be used for shielding. Furthermore, such shielding by the battery and/or additional shielding elements may not be sufficient. It is an advantage that the need for shielding within the hearing aid may be reduced or eliminated. It is a further advantage that a hearing aid with improved wireless communication capabilities may be provided. Thus, it is an advantage that a hearing aid with improved wireless communication capabilities may be provided with a reduced or eliminated need for shielding.

When in use, a SMPS will typically provide bursts of current passing through a coil component, meaning that an electric field is changing. This will cause radiation of a magnetic field, which may disturb or affect sensitive components within the hearing aid that may couple to this magnetic field. Thus, typically, the magnetic field produced by the SMPS is considered as an unwanted field and is considered as noise. Different components within the hearing aid may be sensitive to such noise. For example, the noise typically produced by an SMPS may prevent reception of wanted wireless communication signals for a communication coil. It is an advantage that the magnetic field produced by the SMPS in the hearing aid, and thereby the noise produced by the SMPS, may be reduced or cancelled out. It is an advantage that the reduction or elimination of an unwanted magnetic field from the SMPS may enable co-existence of noise sensitive components, such as e.g. one or more communication coils, and the SMPS within a same housing or a same shell of the hearing aid.

The hearing aid is configured to be worn at a user's ear. The hearing aid may be arranged at the user's ear, on the user's ear, in the user's ear, in the user's ear canal, behind the user's ear etc. The user may wear two hearing aids, such as one hearing aid at each ear.

The hearing aid may comprise a housing. The housing may be configured for being provided behind the outer ear of the user during use. The hearing aid may comprise a shell configured for being provided in the ear canal of the use during use. The electronic components of the hearing aid may be provided within the housing and/or within the shell.

The hearing aid may be configured for performing hearing compensation for the user. Additionally, the hearing aid may be configured for audio communication, e.g. enabling the user to listen to media, such as music or radio, and/or enabling the user to perform phone calls.

The hearing aid may be any hearing aid, such as any hearing aid compensating a hearing loss of a wearer of the hearing aid. The person skilled in the art is well aware of different kinds of hearing aids and of different options for arranging the hearing aid in and/or at the ear of the hearing aid wearer.

For example, the hearing aid may be a Receiver-In-Canal (RIC) or Receiver-In-the-Ear (RIE or RITE) or a Microphone-and-Receiver-In-the-Ear (MaRIE) type hearing aid, in which a receiver is positioned in the ear, such as in the ear canal, of a wearer during use, for example as part of an in-the-ear unit, while other hearing aid components, such as a signal processor, a wireless communication unit, a battery, etc. are provided as an assembly and mounted in a housing of a Behind-The-Ear (BTE) unit. A plug and socket connector may connect the BTE unit and the earpiece, e.g. RIE unit or MaRIE unit. The hearing aid may be an in-the-ear (ITE), in-the-canal (ITC), or completely-in-the-canal (CIC) aid with a shell shaped and sized to fit into the user's ear canal. The shell may enclose all hearing aid components, such as signal processor, input transducer, etc.

The hearing aid comprises an input transducer, e.g. a microphone, for generating one or more input signals based on a received audio signal. The audio signal may be an analogue signal. The input signal may be a digital signal. Thus, the first input transducer, e.g. microphone, or an analogue-to-digital converter, may convert the analogue audio signal into a digital input signal. All the signals may be sound signals or signals comprising information about sound.

The hearing aid comprises a signal processor configured for processing the one or more input signals. The one or more input signals may be provided to the signal processor for processing the one or more input signals. The signals may be processed such as to compensate for a user's hearing loss or hearing impairment. The signal processor may provide an output signal.

The hearing aid comprises an output transducer, e.g. a receiver, speaker or loudspeaker, for providing an audio output signal based on the output signal from the signal processor. The output transducer may be connected to an output of the signal processor. The output transducer may output the output signal into the user's ear. The output transducer, or a digital-to-analogue converter, may convert the output signal, which is a digital signal, from the processor to an analogue signal.

The hearing aid comprises a switched-mode power supply (SMPS) for providing electric power to the hearing aid. A SMPS may also be referred to as a switching-mode power supply, switch-mode power supply, switched power supply, or switcher. A SMPS is generally known as an electronic power supply that incorporates a switching regulator to convert electrical power. In other words, a SMPS typically transfers power from a DC source to DC loads, while converting voltage and current characteristics. A switching regulator in a SMPS typically comprises a transistor and a diode. A SMPS typically comprises an energy storage element, such as a capacitor, an inductor, or the two in combination. A SMPS will then typically be switching, using the switching regulator, between different electrical configurations, or different states, for the energy storage element.

The switched-mode power supply (SMPS) is configured for providing electric power to the hearing aid, and the electric power may be produced by a battery in the hearing aid. The first and the second coil component may be configured for being an energy storage element of the SMPS. The SMPS may comprise one or more switching regulators, or switches, such as a transistor, e.g. a MOSFET, IGBT, or BJT transistor, and/or a diode. The SMPS may comprise a circuit, such that the electrical components comprised in the SMPS may be interconnected. The SMPS may be configured for switching, using the one or more switching regulators, between different electrical configurations, or different states, for the energy storage element, such as for the first coil component and the second coil component.

The battery in the hearing aid may be a rechargeable battery, which is configured to be recharged in a charger, e.g. the hearing aid comprising the battery may be inserted in the charger for charging the battery. The SMPS may be connected to the battery and may be configured for converting a voltage provided by the battery to a lower voltage value or level. In other words, the SMPS may step down the voltage provided from the battery. The SMPS may be provided between the battery and the load of the hearing aid. In other words, the SMPS may be provided between the battery and the electric or electronic components of the hearing aid that requires a power supply, such as e.g. the input transducer, the signal processor, etc.

The frequency of electromagnetic noise originating from a SMPS is typically determined by its switching frequency for when the SMPS is switching between different electrical configurations, or different states, for the energy storage element. Typically, this frequency may be about 100 kHz. Due to the harmonics of such a signal, the noise will typically be present at a large frequency range. This frequency range may overlap with the frequency value or range used by other components within the hearing aid. Thus, components within a hearing aid, such as communication coils, may be susceptible to electromagnetic noise originating from a SMPS.

The switched-mode power supply (SMPS) comprises a first coil component and a second coil component. The first coil component and second coil component may constitute dual coil components. A coil component may be known as a coil, an inductor, choke, or reactor, and may be described as a passive two-terminal electrical component that stores energy in a magnetic field when electric current flows through it. The first coil component and the second coil component may be configured to be energy storage elements of the SMPS. Each of the first and second coil components may comprise a wire or a conductor, which may constitute windings around the coil components. The windings of each coil component may have a given orientation. Each of the first and second coil components may comprise terminals configured for electrical connection to other components in the SMPS and/or hearing aid, the electrical connection may be via wires, conducting elements, or transmissions lines, etc.

The first coil component and the second coil component are arranged or coupled to provide electromagnetic noise reduction in the hearing aid. The SMPS may be configured for switching between different electrical configurations, or states, for the first coil component and the second coil components, respectively. Due to the switching between different electrical configurations, or states, for the first coil component and the second coil components, burst of current may be running through the first coil component and the second coil components. Burst of current means an alternating electric field, which generates a magnetic field. The first coil component may generate a first magnetic field. The second coil component may generate a second magnetic field. The first coil component and the second coil component may be arranged such that the magnetic field generated by the first coil component counter-acts the magnetic field generated by the second coil component, thus the first magnetic field may counter-act the second magnetic field. A resulting magnetic field originating from the combination of the first and second magnetic fields may be reduced or cancelled out compared to first magnetic field and/or the second magnetic field if taken in isolation. Hereby, electromagnetic noise originating from the SMPS having the first coil component and the second coil component may be reduced compared to having an SMPS comprising only one coil component. It is envisioned that the noise may be reduced, such as substantially reduced, or even cancelled out or eliminated compared to a noise level from an SMPS comprising only one coil component.

In some embodiments, the first coil component and the second coil component are arranged in proximity to each other. Thus, the first component and the second coil component may be provided close to each other, or neighbouring each other such as next to each other. In other words, the first coil component may be provided adjacent the second coil component or in proximity to the second coil component. The first coil component may be arranged as close to the second coil component as assembly design requirements will allow, such as within a distance less than 2 millimetre (mm), such as less than 1 mm, such as less than 0.5 mm, such as less than 0.25 mm, such as less than 0.1 mm. In other words, the distance between the first coil component and the second coil component may be as small as possible, within the technical tolerance of the method of manufacture. The first coil component and the second coil component may be arranged so close to each other that the magnetic fields generated by the first coil component and the second coil component, respectively, may interact or interfere with each other. When the first coil component and the second coil component are arranged in proximity to each other, the magnetic fields generated by the first coil component and the second coil component, respectively, may interact with each other, such as interact destructively with each other.

In some embodiments, the first coil component and the second coil component are coupled to interact destructively. The first coil component and the second coil component may be coupled such that the magnetic field generated by the first coil component interacts destructively with the magnetic field generated by the second coil component. Due to the principle of superposition, the destructive interaction or interference may be caused by the magnetic field generated by the first coil component, such as the first magnetic field, having a direction opposite a direction of the magnetic field generated by the second coil component, such as the second magnetic field. Thus, the two magnetic fields may have approximately opposite direction at a given instant in time. Approximately opposite directions of the two magnetic fields may in an embodiment be interpreted as the first magnetic field having an opposite direction than a direction of the second magnetic field within +/−15%, more preferably within +/−10%, more preferably within +/−5%, more preferably within +/−1%. The direction of the first and second magnetic fields generated by the first and second coil components, respectively, may be determined by the direction of the current passing through the coil component in question. The direction of the current and thereby the direction of the magnetic field may be determined by the configuration of the terminals of the coil component, the orientation of the windings of the coil component, and/or the orientation of the coil component. Thus, the first coil component and the second coil component may be arranged, provided or coupled such that, due to the configuration of the terminals of the relevant coil component, the orientation of the windings of the relevant coil component, and/or the orientation of the relevant coil component, the first magnetic field generated by the first coil component may have an opposite field direction, such as an approximately opposite field direction, and hereby interacts destructively with the second magnetic field generated by the second coil component. Due to destructive interaction, the resulting field, provided by the combination of the first magnetic field and the second magnetic field, may be reduced or cancelled out.

In some embodiments, the first coil component and the second coil component are arranged such that the magnetic fields generated by the first coil component and the second coil component, respectively, are in counter-phase, such as being out of phase with each other, such as having a phase difference being an odd multiple of π (phi) or 180° (degrees) with respect to each other. The magnetic fields generated by the first coil component and the second coil components, respectively, may have opposite polarizations to interact destructively. Hereby, the first coil component and the second coil component may interact destructively. Due to destructive interaction, the resulting field, provided by the combination of the first magnetic field and the second magnetic field, may be reduced or cancelled out.

In some embodiments, the first coil component and the second coil component have approximately similar or comparable inductances. Approximately similar inductances may in an embodiment be interpreted as the inductance of the first coil component is identical to the inductance of the second coil component within +/−15%, more preferably within +/−10%, more preferably within +/−5%, more preferably within +/−1%. A coil component is typically characterized by its inductance, typically denoted L. Inductance is typically determined by the material of the coil component and the number of windings o or around the coil component. Inductance is typically proportional to the number of windings squared. Typically, a desired L value for a coil component in a SMPS in a hearing aid is around 2.2 pH (micro Henry). A coil component in a SMPS may have from a few windings to several hundreds, such as 2, such as 5, such as 10, such as 20, such as 50, such as 100, such as 200, such as 500. A preferred value may be 20 windings. Thus, the first coil component and the second coil component may have approximately similar number of windings and/or may comprise approximately similar material. Approximately similar number of windings may in an embodiment be interpreted as the number of windings of the first coil component is identical to the number of windings of the second coil component within +/−15%, more preferably within +/−10%, more preferably within +/−5%, more preferably within +/−1%. Approximately similar material may in an embodiment be interpreted as the material of the first coil component being identical to the material of the second coil component within +/−15%, more preferably within +/−10%, more preferably within +/−5%, more preferably within +/−1%. In that the first coil component and the second coil component have approximately similar inductances, the magnetic field generated by the first coil component and the second coil component, respectively, may be approximately similar in magnitude. In other words, the strength of the magnetic fields generated by the first and second coil components may be approximately similar, or approximately equal to each other. Approximately similar magnitude, or approximately similar or approximately equal strength may in an embodiment be interpreted as the magnetic field generated by the first coil component is identical in magnitude and/or strength to the magnetic field generated by the second coil component within +/−15%, more preferably within +/−10%, more preferably within +/−5%, more preferably within +/−1%.

In some embodiments, the first coil component and the second coil component are arranged in series with respect to each other. When the first coil component and the second coil component is arranged in series with respect to each other, the inductance value for each coil component may be approximately about half the value of the desired inductance value for a coil component in a SMPS having only one coil component, thus L/2. As the first and second coil component may have approximately similar inductances, both the first and second components may have an inductance value of approximately L/2, L being the desired L value for a coil component in a SMPS having only one coil component. Approximately L/2 may in an embodiment be interpreted as equal to L/2 within +/−15%, more preferably within +/−10%, more preferably within +/−5%, more preferably within +/−1%. The windings of each coil component may have a given orientation, which may be defined as clockwise and counter-clockwise.

The first coil component and the second coil component may be arranged in series with respect to each other such that the direction of a current passing through the first coil component may be in a same direction as a current passing through the second coil component. When the first coil component and the second coil component are arranged in series with respect to each other, the windings of the first coil component may be wound in an opposite orientation compared to the windings of the second coil component. For example, the windings of the first coil component may have a clockwise orientation, while the windings of the second coil components may have a counter-clockwise orientation, and vice versa. Hereby, the magnetic field generated by the first coil component may have a different direction and may thus counter-act the magnetic field generated by the second coil component, such that the resulting magnetic field may be reduced or cancelled out.

Alternatively, the first coil component and the second coil component may be arranged in series with respect to each other such that the direction of a current passing through the first coil component may be opposite the direction of a current passing through the second coil component. When the first coil component and the second coil component are arranged in series with respect to each other, the windings of the first coil component may be wound in a same orientation as the orientation of the windings of the second coil component. For example, the windings of the first coil component and the windings of the second coil component may both have a clockwise orientation, or they may both have a counter-clockwise orientation. Hereby, the magnetic field generated by the first coil component may have a different direction and may thus counter-act the magnetic field generated by the second coil component, such that the resulting magnetic field may be reduced or cancelled out.

In some embodiments, the first coil component and the second coil component are arranged in parallel with respect to each other. When the first coil component and the second coil component are arranged in parallel with respect to each other, the inductance value for each coil component may be double or twice the desired inductance value for a coil component in a SMPS having only one coil component, thus 2*L. As the first and second coil component may have approximately similar inductances, both the first and second components may have an inductance value of approximately 2*L, L being the desired L value for a coil component in a SMPS having only one coil component. Approximately 2*L may in an embodiment be interpreted as equal to 2*L within +/−15%, more preferably within +/−10%, more preferably within +/−5%, more preferably within +/−1%. The windings of each coil component may have a given orientation, which may be defined as clockwise and counter-clockwise.

The first coil component and the second coil component may be arranged in parallel with respect to each other such that the direction of a current passing through the first coil component may be opposite the direction of a current passing through the second coil component. When the first coil component and the second coil component are arranged in in parallel with respect to each other, the windings of the first coil component may be wound in a same orientation compared to the windings of the second coil component. For example, the windings of the first coil component and the windings of the second coil component may both have a clockwise orientation, or they may both have a counter-clockwise orientation. Hereby, the magnetic field generated by the first coil component may have a different direction and may thus counter-act the magnetic field generated by the second coil component, such that the resulting magnetic field may be reduced or cancelled out.

Alternatively, the first coil component and the second coil component may be arranged in parallel with respect to each other such that the direction of a current passing through the first coil component may be in a same direction as a current passing through the second coil component. When the first coil component and the second coil component are arranged in parallel with respect to each other, the windings of the first coil component may be wound in an opposite orientation compared to the windings of the second coil component. For example, the windings of the first coil component may have a clockwise orientation, while the windings of the second coil components may have a counter-clockwise orientation, and vice versa. Hereby, the magnetic field generated by the first coil component may have a different direction and may thus counter-act the magnetic field generated by the second coil component, such that the resulting magnetic field may be reduced or cancelled out.

In some embodiments, the switched-mode power supply (SMPS) is a buck converter. Typically, a buck converter is also known as a step-down converter and is considered a class of an SMPS. The buck converter may comprise two semiconductor switches as switching regulators, such as a transistor and a diode. Alternatively, the two semiconductor switches may be two transistors. In addition to the first and second coil components, the buck converter may comprise one or more capacitor(s) and a resistor. During operation, the buck converter may be configured for switching, using the switching regulator, between different electrical configurations, or different states, for the first and second coil components, which may be named as the inductor below. The buck converter may be provided between the battery and the electric or electronic components of the hearing aid that requires a power supply.

In the following a prior art example of a switched-mode power supply (SMPS), e.g. being a buck converter, comprising only one coil component or inductor as an energy storage element, and using a switching regulator to switch between different electrical configurations, or different states, for the energy storage element in a SMPS circuit will be described. In other words, a prior art example of a SMPS, e.g. being a buck converter, may operate as follows. Beginning with the switching regulator open (off-state), the current in the circuit is zero. When the switching regulator is closed (on-state), the current will begin to increase, and the inductor produces an opposing voltage across its terminals in response to the changing current. This voltage drop counteracts the voltage of the source (e.g. a battery) and therefore reduces the net voltage across the load (e.g. load of a hearing aid). Over time, the rate of change of current decreases, and the voltage across the inductor also then decreases, increasing the voltage at the load. During this time, the inductor stores energy in the form of a magnetic field. If the switching regulator is opened while the current is still changing, then there may be a voltage drop across the inductor, so the net voltage at the load may be less than the input voltage source. When the switching regulator is opened again (off-state), the voltage source may be removed from the circuit, and the current may decrease. The decreasing current produces a voltage drop across the inductor (opposite to the drop at on-state), and now the inductor becomes a current source. The stored energy in the inductor's magnetic field supports the current flow through the load. This current, flowing while the input voltage source is disconnected, when appended to the current flowing during on-state, totals to current greater than the average input current (being zero during off-state). The "increase" in average current makes up for the reduction in voltage, and ideally preserves the power provided to the load. During the off-state, the inductor is discharging its stored energy into the rest of the circuit. If the switching regulator is closed again before the inductor fully discharges (on-state), the voltage at the load may be greater than zero. As mentioned above, the prior art example of a SMPS comprising only one coil component or inductor may produce electromagnetic noise disturbing components within a hearing aid, such as communication coils, that may be susceptible to electromagnetic noise originating from the SMPS.

The hearing aid as disclosed comprises a SMPS comprising the first coil component and the second coil component. The first coil component and the second coil component are arranged to provide electromagnetic noise reduction in the hearing aid.

In some embodiments, the hearing aid comprises a battery. The battery may be the power source of the hearing aid. The battery may be a rechargeable battery, such as a lithium ion battery. Rechargeable batteries typically have a higher voltage than non-rechargeable batteries. A higher voltage from the battery typically means that the noise level will be higher. Thus, it is an advantage that electromagnetic noise reduction originating from an SMPS connected to a rechargeable battery may be provided.

In some embodiments, the hearing aid comprises one or more communication coils. The first coil component and the second coil component may be arranged to provide electromagnetic noise reduction for the one or more communication coils in the hearing aid. The one or more communication coils may be configured for wireless communication. In some embodiments, the hearing aid may comprise one or more wireless communications unit(s), magnetic induction chip(s), or magnetic induction control unit(s). The one or more wireless communications unit(s) may be configured for wireless data communication, and in this respect interconnected with the one or more communication coils for emission and reception of an electromagnetic field.

In addition to the one or more communication coils, the hearing aid may comprise an RF antenna configured for wireless communication. The RF antenna may be interconnected with a wireless communication unit. The RF antenna may operate for example at around 2.4 GHz. Thus, such as RF antenna will typically not be susceptible to electromagnetic noise originating from the SMPS.

In some embodiments, the one or more communication coils are a magnetic induction (MI) coil and/or a telecoil. Thus, the hearing aid may comprise one or more MI coils. Alternatively, or additionally, the hearing aid may comprise one or more telecoils.

The MI coil may be configured for wireless communication, including transmission of voice, audio and data, in a range of frequencies between 2 MHz and 30 MHz, such as from 2 MHz to 10 MHz, such as from 5 MHz to 15 MHz, such as between 10 MHz and 11 MHz. At these frequencies the electromagnetic radiation to and from the MI coil propagates through and around the human head and body without significant losses in the tissue. The MI coil operating at such frequencies may be susceptible to electromagnetic noise originating from the SMPS, if the noise level is not sufficiently reduced.

The MI coil may be interconnected with a wireless communication unit. The MI coil may be referred to as a magnetic antenna. The MI coil may be configured to wirelessly communicate with another hearing aid, which may be provided in the user's other ear. Thus, the MI coil may be used for Ear-to-Ear (E2E) communication. The MI coil may be configured for wireless communication with other electronic devices. The MI coil may be configured for both wireless emission and reception of an electromagnetic field.

The telecoil, or T-coil, may be configured for wireless reception of an electromagnetic signal. The telecoil may be configured for communicating, or receiving signals from so-called assistive listening systems, such as inductive hearing loop systems, FM systems, and infrared systems. Hereby, the user may be able to listen to media, such as audio from a radio program, a television program or a movie in the cinema, and may be able to perform phone calls, etc. The telecoil may be configured for receiving signals at audio frequencies, which are typically around 10 KHz and below. The telecoil operating at such frequencies may be susceptible to electromagnetic noise originating from the SMPS, if the noise level is not sufficiently reduced.

Thus, the hearing device may comprise one or more wireless communications unit(s) or radios. The one or more wireless communications unit(s) are configured for wireless data communication, and in this respect interconnected with the one or more antennas for emission and reception of an electromagnetic field. Each of the one or more wireless communication unit may comprise a transmitter, a receiver, a transmitter-receiver pair, such as a transceiver, and/or a radio unit. The one or more wireless communication units may be configured for communication using any protocol as known for a person skilled in the art, including Bluetooth, WLAN standards, manufacture specific protocols, such as tailored proximity antenna protocols, such as proprietary protocols, such as low-power wireless communication protocols, RF communication protocols, magnetic induction protocols, etc. The one or more wireless communication units may be configured for communication using same communication protocols, or same type of communication protocols, or the one or more wireless communication units may be configured for communication using different communication protocols.

The one or more communication coils and the SMPS comprising the first coil component and the second coil components may be provided within the same hearing aid housing or within the same hearing aid shell.

Also disclosed is a method for reducing electromagnetic noise in a hearing aid. The hearing aid is configured to be worn at a user's ear. The hearing aid comprises an input transducer for generating one or more input signals based on a received audio signal, a signal processor configured for processing the one or more input signals, an output transducer for providing an audio output signal based on an output signal from the signal processor, a switched-mode power supply (SMPS) for providing electric power to the hearing aid and one or more communication coils for providing wireless communication with one or more electronic devices. The switched-mode power supply (SMPS) comprises a first coil component and a second coil component. The first coil component and the second coil component are arranged to provide electromagnetic noise reduction for the one or more communication coils, when the switched-mode power supply (SMPS) provides electric power to the hearing aid.

It is an advantage that a method for improving electromagnetic noise reduction in a hearing aid is provided. It is an advantage that the method may provide improved wireless communication capabilities in the hearing aid. It is a further advantage that the method may provide improved wireless communication capabilities in the hearing aid with a reduced or eliminated need for shielding.

It is an advantage that the method may provide reduction or elimination of an unwanted magnetic field from the SMPS, thereby enabling co-existence of noise sensitive components, such as e.g. one or more communication coils, and a SMPS within a same housing or a same shell of the hearing aid.

The present disclosure relates to different aspects including the hearing aid described above and in the following, and corresponding hearing devices, electronic devices, methods, uses each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
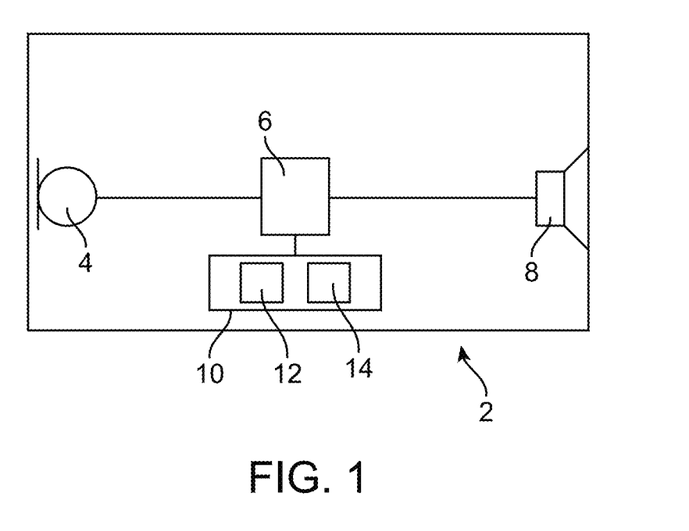
FIG. 1 schematically illustrates an exemplary hearing aid.

FIG. 1 schematically illustrates an exemplary hearing aid 2. The hearing aid 2 is configured to be worn at a user's ear. The hearing aid 2 comprises an input transducer 4 for generating one or more input signals based on a received audio signal. The hearing aid 2 comprises a signal processor 6 configured for processing the one or more input signals. The hearing aid 2 comprises an output transducer 8 for providing an audio output signal based on an output signal from the signal processor 6. The hearing aid 2 comprises a switched-mode power supply (SMPS) 10 for providing electric power to the hearing aid 2. The switched-mode power supply (SMPS) 10 comprises a first coil component 12 and a second coil component 14. The first coil component 12 and the second coil component 14 are arranged to provide electromagnetic noise reduction in the hearing aid 2.

The switched-mode power supply (SMPS) 10 is connected to the signal processor 6.

Figure 2:
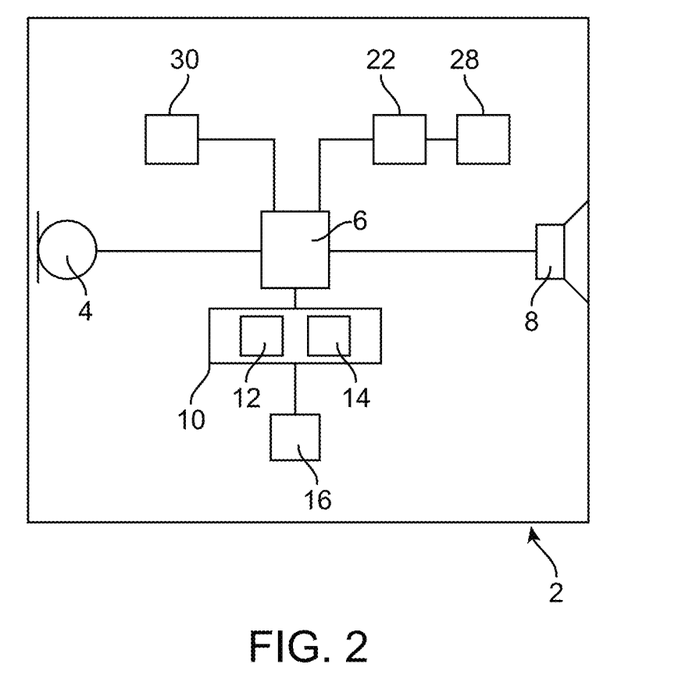
FIG. 2 schematically illustrates an exemplary hearing aid.

FIG. 2 schematically illustrates an exemplary hearing aid 2. The hearing aid 2 in FIG. 2 comprises the same features as the hearing aid in FIG. 1.

The hearing aid 2 is configured to be worn at a user's ear. The hearing aid 2 comprises an input transducer 4 for generating one or more input signals based on a received audio signal. The hearing aid 2 comprises a signal processor 6 configured for processing the one or more input signals. The hearing aid 2 comprises an output transducer 8 for providing an audio output signal based on an output signal from the signal processor 6. The hearing aid 2 comprises a switched-mode power supply (SMPS) 10 for providing electric power to the hearing aid 2. The switched-mode power supply (SMPS) 10 comprises a first coil component 12 and a second coil component 14. The first coil component 12 and the second coil component 14 are arranged to provide electromagnetic noise reduction in the hearing aid 2.

The hearing aid 2 in FIG. 2 comprises additional features described below.

The hearing aid 2 comprises one or more communication coils here illustrated as two communication coils. The first coil component 12 and the second coil component 14 are arranged to provide electromagnetic noise reduction for the one or more communication coils in the hearing aid 2.

In this figure, the one or more communication coils are a magnetic induction (MI) coil 28 and a telecoil 30. Thus, the first coil component 12 and the second coil component 14 are arranged to provide electromagnetic noise reduction for the MI coil 28 and the telecoil 30. The MI coil is interconnected with a wireless communication unit 22.

The first coil component 12 and the second coil component 14 are arranged in proximity to each other.

The first coil component 12 and the second coil component 14 may be arranged in series with respect to each other. This is illustrated in FIG. 3A.

Alternatively, the first coil component 12 and the second coil component 14 may be arranged in parallel with respect to each other. This is illustrated in FIG. 3B.

The hearing aid 2 comprises a battery 16. The battery 16 may be a rechargeable battery. In this figure, the SMPS 10 is provided between the battery 16 and the electric or electronic components of the hearing aid that requires a power supply, illustrated here as the input transducer 4, the signal processor 6, the output transducer 8, the one or more communication coils 28, 30, and the wireless communication unit 22.

Figure 3:
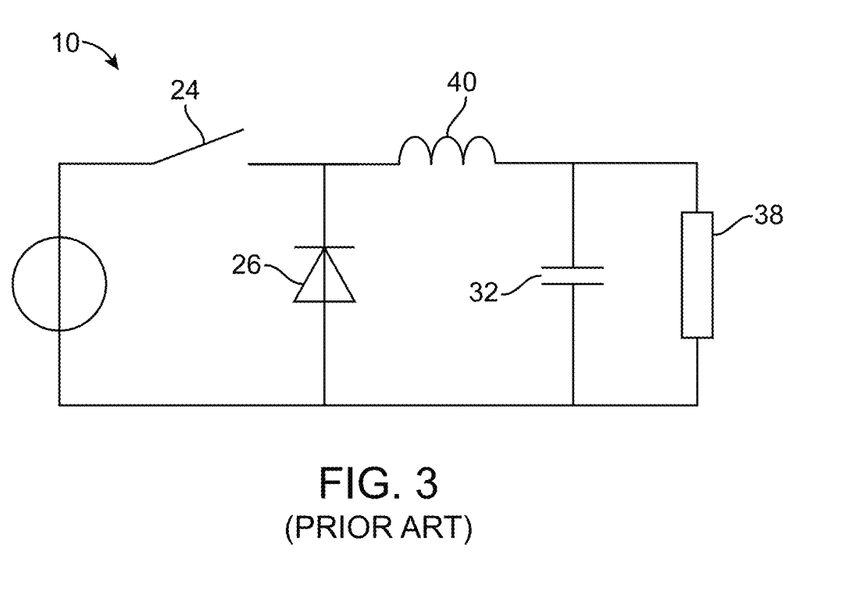
FIG. 3 schematically illustrates an exemplary prior art switch-mode power supply.

FIG. 3 schematically illustrates an exemplary prior art switch-mode power supply (SMPS) 10. The SMPS 10 is illustrated as a buck converter. The buck converter 10 comprises switching regulators 24 and 26, exemplary illustrated here as a transistor and a diode, respectively. The buck converter comprises an inductor 40, a capacitor 32 and a resistor 38. The resistor 38 may correspond to the load e.g. of a hearing aid.

The exemplary prior art SMPS may operate as follows. Beginning with the switching regulator 24 open (off-state), the current in the circuit is zero. When the switching regulator 24 is first closed (on-state), the current will begin to increase, and the inductor 40 produces an opposing voltage across its terminals in response to the changing current. This voltage drop counteracts the voltage of the source (e.g. a battery) and therefore reduces the net voltage across the load. Over time, the rate of change of current decreases, and the voltage across the inductor also then decreases, increasing the voltage at the load. During this time, the inductor 40 stores energy in the form of a magnetic field. If the switching regulator 24 is opened while the current is still changing, then there may be a voltage drop across the inductor 40, so the net voltage at the load may be less than the input voltage source. When the switching regulator 24 is opened again (off-state), the voltage source may be removed from the circuit, and the current may decrease. The decreasing current produces a voltage drop across the inductor 40 (opposite to the drop at on-state), and now the inductor 40 becomes a current source. The stored energy in the inductor's magnetic field supports the current flow through the load. This current, flowing while the input voltage source is disconnected, when appended to the current flowing during on-state, totals to current greater than the average input current (being zero during off-state). The "increase" in average current makes up for the reduction in voltage, and ideally preserves the power provided to the load. During the off-state, the inductor 40 is discharging its stored energy into the rest of the circuit. If the switching regulator 24 is closed again before the inductor 40 fully discharges (on-state), the voltage at the load may be greater than zero. The prior art example of a SMPS comprising only one inductor 40 may produce electromagnetic noise disturbing components within a hearing aid, such as communication coils, that may be susceptible to electromagnetic noise originating from the SMPS.

Figure 4A:
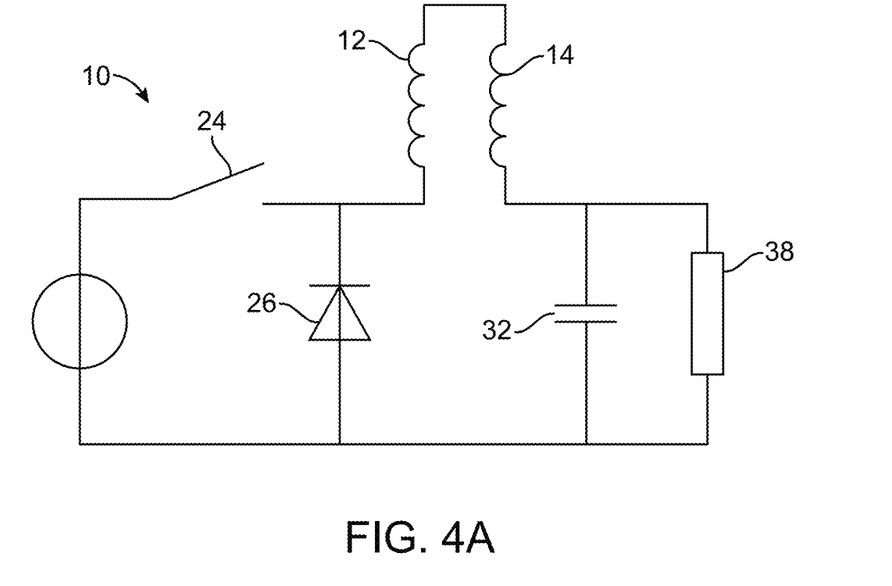
FIGS. 4a and 4b schematically illustrate two exemplary switched-mode power supplies.
Figure 4B:
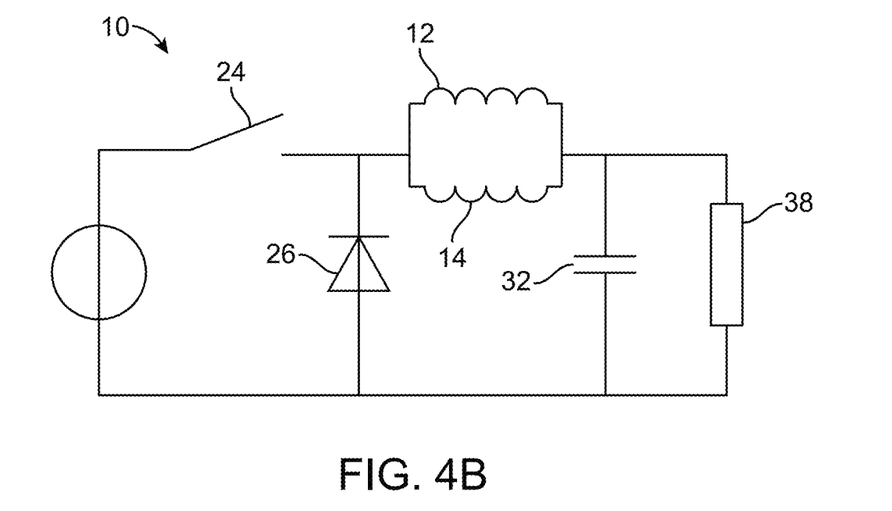

FIGS. 4a and 4b schematically illustrates two exemplary switched-mode power supplies (SMPS) 10 according to some embodiments.

The SMPS 10 is configured for providing electric power to the hearing aid, and the electric power is produced by a battery in the hearing aid. The SMPS 10 is connected to the battery.

As in FIG. 3, the SMPS 10 is illustrated as a buck converter and comprises switching regulators 24, 26, a capacitor 32 and a resistor 38. But instead of comprising a single inductor as in the prior art example shown in FIG. 3, the SMPS in FIGS. 4a and 4b comprises a first coil component 12 and a second coil component 14 arranged to provide electromagnetic noise reduction when provided in a hearing aid.

FIG. 4a shows the first coil component 12 and the second coil component 14 arranged in series with respect to each other.

FIG. 4b shows the first coil component 12 and the second coil component 14 arranged in parallel with respect to each other.

FIGS. 5a, 5b, 5c and 5d schematically illustrate four exemplary arrangement of the first and second coil components 12, 14.

In all four arrangements, the first coil component 12 and the second coil component 14 are arranged in proximity to each other.

In all four arrangements, the first coil component 12 and the second coil component 14 are coupled to interact destructively.

In all four arrangements, the first coil component 12 and the second coil component 14 are arranged such that the magnetic fields generated by the first coil component 12 and the second coil component 14, respectively, are in counter-phase during operation.

The first coil component 12 and the second coil component 14 have approximately similar inductances.

Each of the first and second coil components 12, 14 comprises a wire or a conductor, which constitutes windings around the coil components 12, 14. The windings of each coil component 12, 14 have a given orientation, indicated in the figures by black dots. Each of the first and second coil components 12,14 comprises terminals (not shown) configured for electrical connection to other components in the SMPS and/or hearing aid, e.g. as illustrated in FIGS. 1, 2 and 4, and the electrical connection may be via wires, conducting elements, or transmissions lines, etc.

Figure 5A:
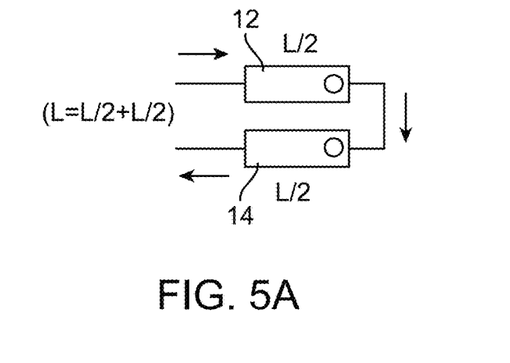
FIGS. 5a, 5b, 5c and 5d schematically illustrate four exemplary arrangements of dual coil components.
Figure 5B:
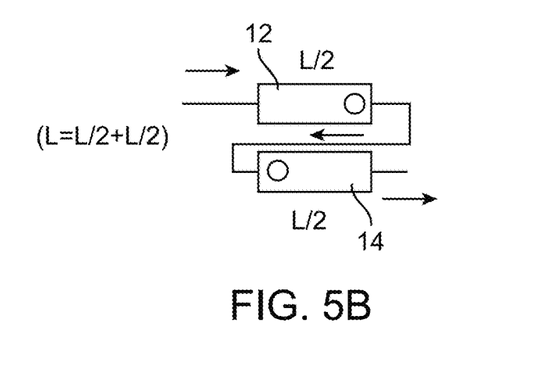

FIGS. 5a and 5b show the first coil component 12 and the second coil component 14 arranged in series with respect to each other.

In FIG. 5a, the first coil component 12 and the second coil component 14 are arranged in series with respect to each other such that the direction of a current (indicated by arrows) passing through the first coil component 12 may be opposite the direction of a current (indicated by arrows) passing through the second coil component 14. In FIG. 5a, the windings of the first coil component 12 is illustrated as being wound in a same orientation as the orientation of the windings of the second coil component 14, as indicated by the black dots.

In FIG. 5b, the first coil component 12 and the second coil component 14 are arranged in series with respect to each other such that the direction of a current (indicated by arrows) passing through the first coil component 12 is in a same direction as a current (indicated by arrows) passing through the second coil component 14. In FIG. 5b, the windings of the first coil component 12 are illustrated as being wound in an opposite orientation compared to the windings of the second coil component 14, as indicated by the black dots.

Figure 5C:
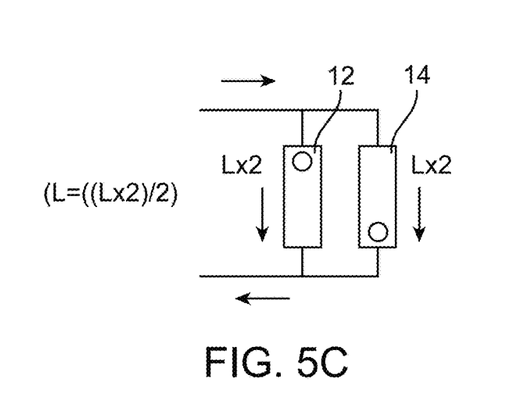
Figure 5D:
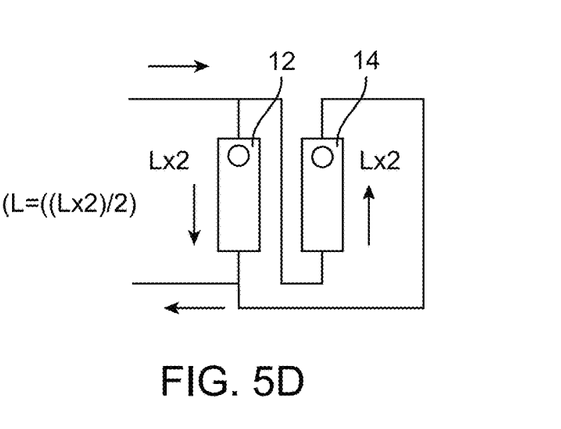

FIGS. 5c and 5d show the first coil component 12 and the second coil component 14 arranged in parallel with respect to each other.

In FIG. 5c, the first coil component 12 and the second coil component 14 are arranged in parallel with respect to each other such that the direction of a current (indicated by arrows) passing through the first coil component 12 is in a same direction as a current (indicated by arrows) passing through the second coil component 14. In FIG. 5c, the windings of the first coil component 12 are illustrated as being wound in an opposite orientation compared to the windings of the second coil component 14, as indicated by the black dots.

In FIG. 5d, the first coil component 12 and the second coil component 14 are arranged in parallel with respect to each other such that the direction of a current (indicated by arrows) passing through the first coil component 12 is opposite the direction of a current (indicated by arrows) passing through the second coil component 14. In FIG. 5d, the windings of the first coil component 12 are illustrated as being wound in a same orientation compared to the windings of the second coil component 14, as indicated by the black dots.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:
1. A hearing aid configured to be worn at a user's ear, the hearing aid comprising:
    an input transducer for generating one or more input signals based on a received audio signal;

a signal processor configured for processing the one or more input signals;

an output transducer for providing an audio output signal based on an output signal from the signal processor;

a switched-mode power supply (SMPS) for providing electric power to the hearing aid;

wherein the switched-mode power supply (SMPS) comprises:
  a first coil component; and
  a second coil component;

wherein the first coil component and the second coil component are arranged to provide electromagnetic noise reduction in the hearing aid.

2. The hearing aid according to any of the preceding items, wherein the first coil component and the second coil component are arranged in proximity to each other.

3. The hearing aid according to any of the preceding items, wherein the first coil component and the second coil component are coupled to interact destructively.

4. The hearing aid according to any of the preceding items, wherein the first coil component and the second coil component are arranged such that the magnetic fields generated by the first coil component and the second coil components, respectively, are in counter-phase.

5. The hearing aid according to any of the preceding items, wherein the first coil component and the second coil component have approximately similar inductances.

6. The hearing aid according to any of the preceding items, wherein the first coil component and the second coil component are arranged in series with respect to each other.

7. The hearing aid according to any of the preceding items, wherein the first coil component and the second coil component are arranged in parallel with respect to each other.

8. The hearing aid according to any of the preceding items, wherein the switched-mode power supply (SMPS) is a buck converter.

9. The hearing aid according to any of the preceding items, wherein the hearing aid comprises a battery; and wherein the battery is a rechargeable battery.

10. The hearing aid according to any of the preceding items, wherein the hearing aid comprises one or more communication coils, and wherein the first coil component and the second coil component are arranged to provide electromagnetic noise reduction for the one or more communication coils in the hearing aid.

11. The hearing aid according to any of the preceding items, wherein the one or more communication coils are a magnetic induction (MI) coil and/or a telecoil.

12. A method for reducing electromagnetic noise in a hearing aid, the hearing aid is configured to be worn at a user's ear, the hearing aid comprising:

an input transducer for generating one or more input signals based on a received audio signal;

a signal processor configured for processing the one or more input signals;

an output transducer for providing an audio output signal based on an output signal from the signal processor;

a switched-mode power supply (SMPS) for providing electric power to the hearing aid;

one or more communication coils for providing wireless communication with one or more electronic devices;

wherein the switched-mode power supply (SMPS) comprises:
  a first coil component; and
  a second coil component;

wherein the first coil component and the second coil component are arranged to provide electromagnetic noise reduction for the one or more communication coils, when the switched-mode power supply (SMPS) provides electric power to the hearing aid.

LIST OF REFERENCES 2 hearing aid
4 input transducer
6 signal processor
8 output transducer
10 SMPS
12 first coil component
14 second coil component
16 battery
22 wireless communication unit
24 transistor
26 diode
28 MI coil
30 telecoil
32 capacitor
38 resistor
40 inductor

The invention claimed is:

1. A hearing device comprising:
an input transducer configured to provide one or more input signals based on a received audio signal;
a signal processor configured to provide an output signal based on the one or more input signals;
an output transducer configured to provide an audio output signal based on the output signal from the signal processor; and
a switched-mode power supply (SMPS) configured to provide electric power, wherein the switched-mode power supply (SMPS) comprises a first coil component and a second coil component;
wherein the first coil component and the second coil component are configured to provide electromagnetic noise reduction in the hearing device; and
wherein the first coil component of the switched-mode power supply (SMPS) and the second coil component of the switched-mode power supply (SMPS) are coupled to magnetically interact with each other.

2. The hearing device according to claim 1, wherein the first coil component and the second coil component are within 2 mm from each other.

3. The hearing device according to claim 1, wherein the first coil component and the second coil component are coupled to magnetically interact with each other destructively.

4. The hearing device according to claim 1, wherein the first coil component and the second coil component have approximately similar inductances.

5. The hearing device according to claim 1, wherein the first coil component and the second coil component are in series with respect to each other.

6. The hearing device according to claim 1, wherein the first coil component and the second coil component are parallel with respect to each other.

7. The hearing device according to claim 1, wherein the switched-mode power supply (SMPS) is a buck converter.

8. The hearing device according to claim 1, further comprising a battery, and wherein the battery is a rechargeable battery.

9. The hearing device according to claim 1, further comprising one or more communication coils.

10. The hearing device according to claim 9, wherein the first coil component and the second coil component are configured to provide the electromagnetic noise reduction for the one or more communication coils.

11. The hearing device according to claim 9, wherein the one or more communication coils comprise a magnetic induction (MI) coil and/or a telecoil.

12. The hearing device according to claim 1, wherein the hearing device is a hearing aid.

13. The hearing device according to claim 12, wherein the hearing aid is configured to be worn at an ear of a user.

14. A hearing device comprising:
- an input transducer configured to provide one or more input signals based on a received audio signal;
- a signal processor configured to provide an output signal based on the one or more input signals;
- an output transducer configured to provide an audio output signal based on the output signal from the signal processor; and
- a switched-mode power supply (SMPS) configured to provide electric power, wherein the switched-mode power supply (SMPS) comprises a first coil component and a second coil component;
- wherein the first coil component of the switched-mode power supply (SMPS) and the second coil component of the switched-mode power supply (SMPS) are arranged such that magnetic fields generated respectively by the first coil component and the second coil component interact with each other and are in counter-phase.

15. The hearing device of claim 14, wherein the first coil component and the second coil component are configured to provide electromagnetic noise reduction in the hearing device.

16. A method performed by a hearing device, the method comprising:
- providing one or more input signals by an input transducer based on a received audio signal;
- providing an output signal by a signal processor based on the one or more input signals;
- providing an audio output signal based on the output signal; and
- providing electric power by a switched-mode power supply (SMPS), wherein the switched-mode power supply (SMPS) comprises a first coil component, and a second coil component, wherein the first coil component of the switched-mode power supply (SMPS) and the second coil component of the switched-mode power supply (SMPS) are configured to magnetically interact with each other, and wherein the first coil component and the second coil component are configured to provide electromagnetic noise reduction in the hearing device.

17. The method of claim 16, wherein the hearing device comprises a hearing aid.

18. The method of claim 17, wherein the hearing aid is configured to be worn at an ear of a user.

19. The method of claim 16, further comprising wirelessly communicating with an electronic device via one or more communication coils.

20. The method of claim 19, further comprising providing the electromagnetic noise reduction for the one or more communication coils by the first coil component and the second coil component.

21. The method of claim 20, wherein the electromagnetic noise reduction is provided by the first coil component and the second coil component when the switched-mode power supply (SMPS) is providing the electric power.

22. The method of to claim 16, wherein the first coil component and the second coil component are configured to magnetically interact with each other destructively.

23. The method of claim 16, wherein the first coil component of the switched-mode power supply (SMPS) and the second coil component of the switched-mode power supply (SMPS) are arranged such that magnetic fields generated respectively by the first coil component and the second coil component interact with each other and are in counter-phase.

* * * * *